US007484097B2

(12) United States Patent
Steiger et al.

(10) Patent No.: US 7,484,097 B2
(45) Date of Patent: Jan. 27, 2009

(54) METHOD AND SYSTEM FOR COMMUNICATING DATA TO AND FROM NETWORK SECURITY DEVICES

(75) Inventors: John Thomas Steiger, Alexandria, VA (US); Robert Edward Schafrik, Jr., Falls Church, VA (US); Amir Hirsh, Alexandria, VA (US); Kristine Dejoras Mendoza, Falls Church, VA (US)

(73) Assignee: Symantec Corporation, Cupertino, CA (US)

( * ) Notice: Subject to any disclaimer, the term of this patent is extended or adjusted under 35 U.S.C. 154(b) by 798 days.

(21) Appl. No.: 10/395,803

(22) Filed: Mar. 24, 2003

(65) Prior Publication Data

US 2003/0217292 A1 Nov. 20, 2003

Related U.S. Application Data

(60) Provisional application No. 60/370,092, filed on Apr. 4, 2002.

(51) Int. Cl.
*H04L 9/32* (2006.01)
(52) U.S. Cl. .................... 713/176; 713/168; 713/178; 726/1; 726/26; 726/30; 709/223; 709/229
(58) Field of Classification Search ............. 713/168, 713/176, 178; 726/2, 15, 18, 22, 26, 1; 709/223, 709/229
See application file for complete search history.

(56) References Cited

U.S. PATENT DOCUMENTS

| 5,940,591 | A * | 8/1999 | Boyle et al. ............. 726/3 |
| 6,317,829 | B1 * | 11/2001 | Van Oorschot ........... 713/155 |
| 6,470,384 | B1 * | 10/2002 | O'Brien et al. ........... 709/223 |
| 6,678,827 | B1 * | 1/2004 | Rothermel et al. ........... 726/6 |
| 6,694,045 | B2 * | 2/2004 | Chung et al. .............. 382/119 |
| 6,704,874 | B1 * | 3/2004 | Porras et al. ................ 726/22 |
| 6,772,331 | B1 * | 8/2004 | Hind et al. ................ 713/151 |
| 6,789,202 | B1 * | 9/2004 | Ko et al. .................... 726/23 |
| 6,826,690 | B1 * | 11/2004 | Hind et al. ................ 713/186 |
| 6,941,467 | B2 * | 9/2005 | Judge et al. ................ 726/22 |
| 6,965,881 | B1 * | 11/2005 | Brickell et al. ............. 705/76 |
| 6,988,208 | B2 * | 1/2006 | Hrabik et al. .............. 726/23 |
| 6,990,591 | B1 * | 1/2006 | Pearson .................... 726/22 |
| 7,168,093 | B2 * | 1/2007 | Hrabik et al. .............. 726/22 |
| 7,237,264 | B1 * | 6/2007 | Graham et al. ............. 726/23 |
| 2002/0120851 | A1 * | 8/2002 | Clarke ..................... 713/178 |
| 2002/0152380 | A1 * | 10/2002 | O'Shea et al. ............. 713/170 |
| 2002/0178383 | A1 * | 11/2002 | Hrabik et al. ............. 713/201 |
| 2002/0191548 | A1 * | 12/2002 | Ylonen et al. ............. 370/254 |
| 2003/0159048 | A1 * | 8/2003 | Matsumoto et al. ........ 713/178 |
| 2003/0217292 | A1 * | 11/2003 | Steiger et al. ............. 713/201 |
| 2004/0181690 | A1 * | 9/2004 | Rothermel et al. ......... 713/201 |

* cited by examiner

*Primary Examiner*—Nasser G Moazzami
*Assistant Examiner*—Shanto M Abedin
(74) *Attorney, Agent, or Firm*—Meyertons Hood Kivlin Kowert & Goetzel, P.C.

(57) ABSTRACT

A method and system for transmitting data from a computer network security device for monitoring at least one computer network node to an operations center for monitoring at least the computer network security device and to the computer network security device from the operations center in a managed computer network security system including at least the computer network security device and operations center, including establishing security information associated with the at least one computer network security device. The established security information is used to authenticate data transmissions from the computer network security device to the operations center. The established security information is used to authenticate data transmission to the computer network security device from the operations center.

25 Claims, 11 Drawing Sheets

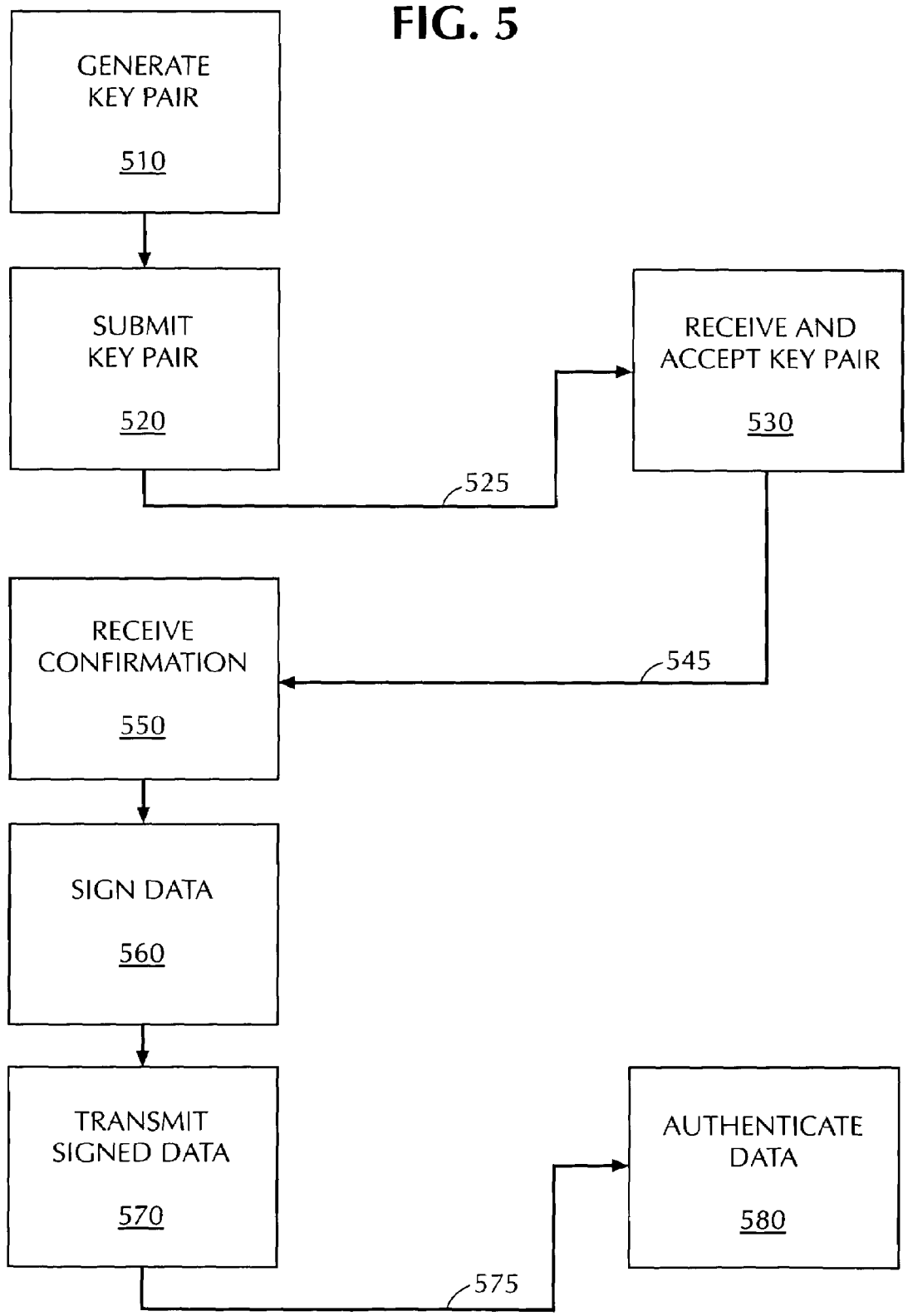

METHOD AND SYSTEM FOR COMMUNICATING DATA TO AND FROM NETWORK SECURITY DEVICES

CROSS REFERENCE TO RELATED APPLICATIONS

This application claims priority to U.S. provisional application Ser. No. 60/370,092, filed on Apr. 4, 2002 which is hereby incorporated by reference.

FIELD OF THE INVENTION

The present invention relates generally to network security, and particularly to managed network security systems and methods.

BACKGROUND OF THE INVENTION

Information security administrators face numerous challenges today. Rapidly increasing attacks through computing networks, such as the global interconnection of computing devices and computing networks commonly referred to as the Internet, coupled with the persistent threat of insider abuse, demand the attention of sophisticated staffing, often on a day-to-day basis. Administrators often choose to implement systems designed to prevent unauthorized access to or from private networks, such as security devices, or client security devices, like firewalls and Intrusion Detection Systems (IDS's).

A firewall can generally be described as a system designed to prevent unauthorized access to or from a computer network, such as an intranet. Firewalls can generally be implemented in either hardware and software, or combination thereof. Messages entering or leaving the protected network pass through the firewall, which examines traversing messages and blocks those that do not meet specified security criteria.

IDSs generally inspect inbound and outbound network activity and identify suspicious patterns that may indicate a network or system attack from someone attempting to break into or compromise a network or system.

However, as network operators, such as corporations, deploy more and more security solutions like firewalls and IDS's to protect against threats, the amount of data generated by these solutions becomes more and more overwhelming, in terms of both volume and specificity. In order to adequately protect computer information assets on a full-time basis, information security staff should typically constantly consider data from many security devices and systems. Administrators can attempt to consolidate this data for viewing purposes, but often, the efficient, real time analysis capabilities of commercially available consolidation software, like Cyberwolf, lack the capability to provide meaningful information in an efficient manner, as selected pieces of data of particular value are often included within voluminous data sets.

Further exacerbating the situation, it is believed that many organizations find it difficult to staff with sufficient security expertise required to effectively process security data. Since network and system attacks generally occur around-the-clock, the ability to analyze and respond to information provided by security devices and solutions in general and in real time is often differentiated only by the success or failure of network or system assaults.

Thus, a need exists for a system and method that is designed to overcome this challenge. Such a managed security services system would preferably include a capability to process and analyze the massive amounts of data generated by security devices throughout a client's enterprise and provide corporate information security staff with the intelligence helpful in understanding and responding to security threats in substantially real-time.

SUMMARY OF THE INVENTION

A method and system for transmitting data from a computer network security device for monitoring at least one computer network node to an operations center for monitoring at least the computer network security device and to the computer network security device from the operations center in a managed computer network security system including at least the computer network security device and operations center, the method including: establishing security information associated with the at least one computer network security device; using the established security information to authenticate data transmissions from the computer network security device to the operations center; and, using the established security information to authenticate data transmission to the computer network security device from the operations center.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which:

FIG. 5 illustrates a functional block diagram of a method according to an aspect of the present invention and being suitable for use with the system of FIG. 1;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical computing networks and managed security system. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to security threat detection, analysis and response systems known to those skilled in the art.

Figure 1:
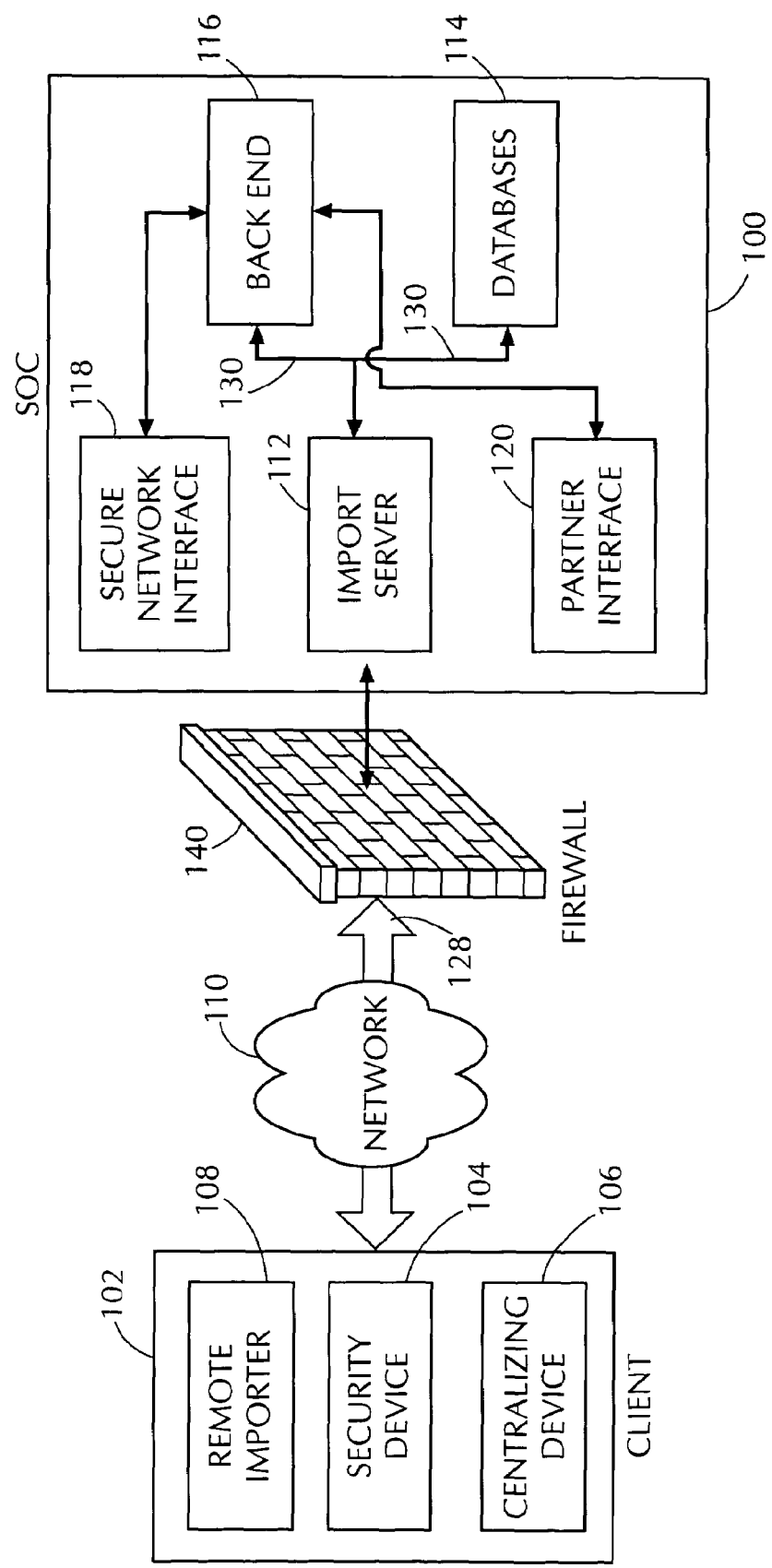
FIG. 1 illustrates a block diagram of a system according to an aspect of the present invention.

Referring now to the figures, for sake of explanation like references there throughout designated like elements of the invention. FIG. 1 illustrates block diagrammatic representation of a system according to as aspect of the present invention. The system generally includes a Security Operations Center (SOC) 100 being protected by a firewall 140 or other suitable security device or devices. The SOC 100 generally includes a Secure Internet Interface 118, one or more import services providers 112, such as import servers 112, and one or more partner interfaces 120 for allowing system inter-operability, for example. The SOC may further include a back end 116 for data analysis and processing and one or more customer databases 114.

The SOC 100 interfaces with a client 102, such as a customer or client network, via a network 110, such as the Internet, to provide security functionality. The SOC may, for example, provide security analysts with information to enable investigation and understanding of potentially questionable or malicious activity occurring at the client 102, and to assist in formulating and communicating to a network administrator a suggested appropriate response.

The term "client" as used herein generally means any security device, network or system that generates, communicates or gathers security log data and includes one or more client security devices. A "security device", "client device" or "client security device" may take the form of any suitable device that generates security log data, such as for example a firewall or IDS. Non-limiting examples of suitable client security devices include commercially available Checkpoint firewalls, Cisco PIX firewalls, NetScreen firewalls, Enterasys Dragon IDS's and ISS RealSecure IDS's.

FIG. 1 illustrates a client 102 which includes one or more client security devices 104. The client 102 may further include one or more remote agent applications 108 associated with one or more of the client security devices 104. "Application" as used herein generally refers to a program or group of programs. The use of "program" herein generally refers to an organized list of instructions that, when executed by a computing device, such as a client security device 104, causes it to behave in a predetermined manner. The client 102 may further include a centralizing computing device 106 which gathers security log data from client security devices 104.

Referring still to FIG. 1, import servers 112 within the SOC may accept information from the client 102, such as from the remote agent 108, and provide the information for retrieval by back end 116 for analysis and/or customer data base servers 114 for storage. "Server" as used herein generally refers to a computing device that manages network resources. For example, client 102 may include at least one centralizing device 106, such as a single networked computer or server, having associated therewith a remote agent application 108. The centralizing device intakes or gathers data from at least two discreet client security devices 104, and the remote agent communicates the gathered data to the import servers 112 as will be discussed. Alternatively, a client 102 may include a single client security device 104 having a remote agent application operable therewith, such as by being installed on it. The remote agent may communicate generated log data to the import servers 112.

Remote agent 108 may be included within a client security device 104 or centralizing device 106, which client security device 104 or centralizing device 106 may be resident in hardware or software, and include a memory for the storage of data, or for caching log data, for example. Centralizing device 106 may intake files in individual client security device 104 file formats, such as by device type, or within a master file including multiple device formats within a single file, such as device types or device files selected from checkpoint firewall files, PIX firewall files and/or Intrusion Detection System ("IDS") files, such as Dragon files, Raptor files or ISS files. In the present invention, any device including the remote agent may be treated as a single centralizing device, including individual devices and central devices, thereby allowing the single collective device to securely transmit data to and receive data from the SOC.

For example, security log data may be pushed by remote agent 108 into at least one import server 112 such as pushing from each client 102 via the remote agent 108 on the client 102. The acquired data may be pulled from the import server 112 by the SOC 100 for processing, thereby preventing direct contact between the non-secure outside systems or networks and the back end 116. The remote agent may make a local backup of pre-selected data prior to pushing out from, or prior to having data pulled from, the remote agent, in order to avoid any losses of data during transmission to the SOC via the network 128.

The remote agent 108 may accept instructions from the SOC, such as instructions as to time periods required for storage, or instructions as to new, or updated, allowable device types, and formats for data files of those new device types. Remote agent 108 may include a timed data back-up, which may be variable in accordance with at least one instruction received from a remote location accessible to the remote agent 108, such as the SOC, and which may back-up all, or a selected portion of, the data, in accordance with received instruction. Remote agent 108 may receive new or updated device types or file formats and process those file formats appropriately.

According to an aspect of the present invention, software to configure client security devices 104 may be associated with the client security devices 104, either locally at the client 102, or remotely, such as by communication between the SOC, such as by through a remote agent 108, SOC and network 110. Thus, the remote agent 108 may take the form of an agent of the SOC in providing log data generated by monitored client security devices 104 to the SOC 100, back-up for the SOC 100, and in allowing for updates from the SOC 100 to the client 102. "Agent" as used herein generally refers to an application or program that performs some information gathering or processing task, possibly in the background. Thus, according to an aspect of the present invention, a software agent may be installed as the remote agent 108 on a client security device 104 or centralizing device 106, or generally on a client 102.

According to an aspect of the present invention, a data normalization engine 115 may be provided behind firewall 140 and may, cooperatively with the file formatting at the remote agent 108 for example, provide for the normalization of acceptable data formats into a uniform format, in order to allow for simplified analysis at the SOC 100 using back end 116, for example. Thus, because different client security devices communicating data to the SOC produce different logs and alerts in different formats, the normalization engine 115 may serve to convert communicated acquired data into a standardized format prior to performing data mining and event correlation by the back end 116. Further, data normalization allows for enhanced detection of malicious activity by analyzing data from different device types. The normalization engine 115 may reside in a protected internal network of the SOC 100, such as within back end 116.

A secure and encrypted connection 128 between client 102 and import server 112 may serve to securely transmit data generated by client security devices 104 from client 102 to import server 112, through normalization, to back-end 116 of the SOC. Thereby, client communications traffic data may be accepted into the SOC via network connection 128.

The SOC 100 may be provided with a plurality of, such as four (4), network 110 connections. These connections may serve as a precaution against denial of service (DoS) attacks against the SOC. A portion of the SOC, such as the back end zone, may be used to store client security data for analysis, according to an aspect of the present invention.

Figure 2:
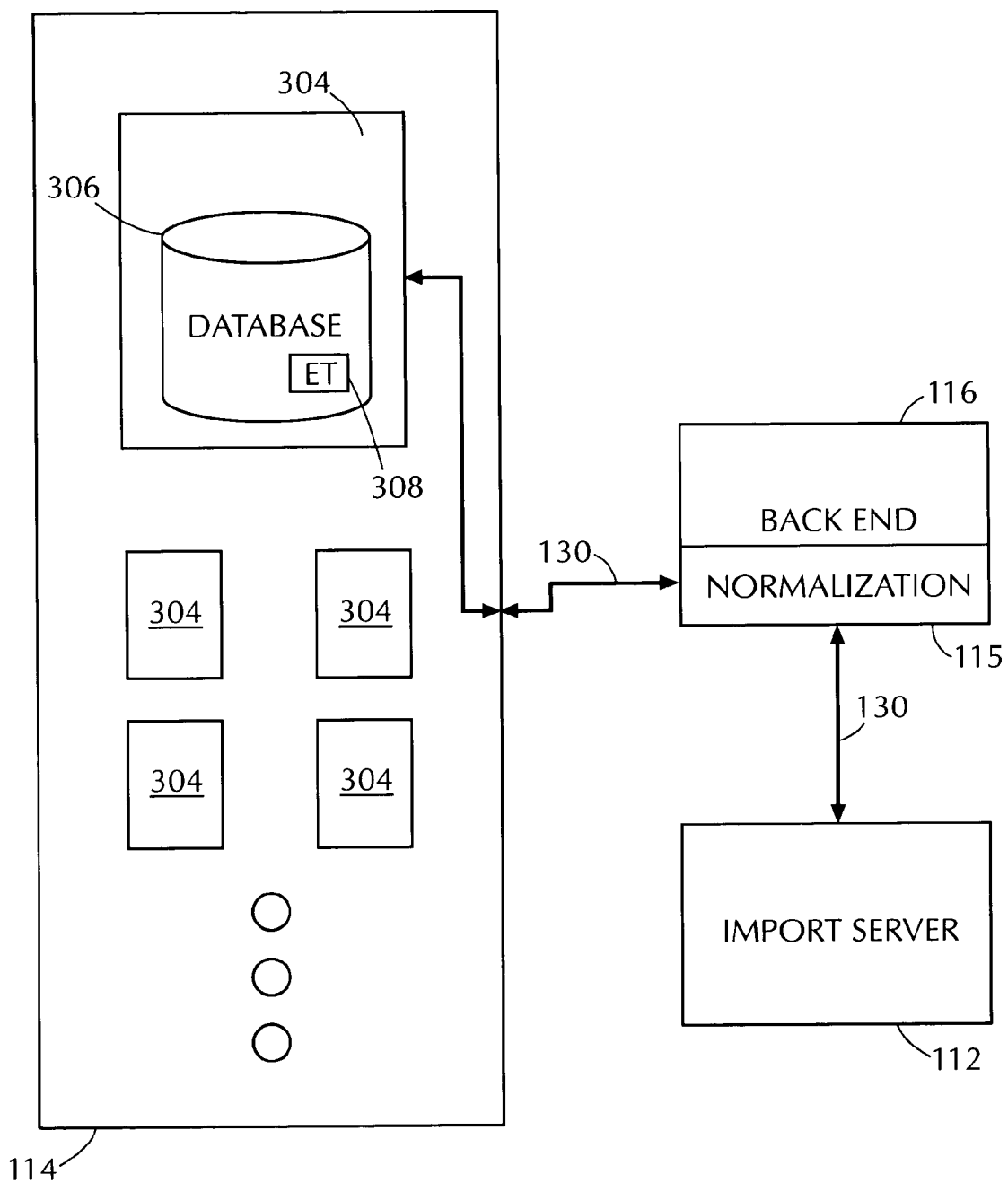
FIG. 2 illustrates a block diagram of a database portion of the system of FIG. 1.

Referring now also to FIG. 2, there is shown a block diagrammatic view of customer database server area 114 of FIG. 1 and its interconnection 130 with the import server 112 and back-end network 116. Once security log data arrives at the import server 112 and has been formatted by the normalization engine 115, the data may be stored and distributed to a database 306, such as a Microsoft Structured Query Language (SQL) database, via one or more database servers 304. The client base of database 306 may be distributed across servers 304 as a distributed data architecture for enhanced scalability, as is well understood in the pertinent arts. "Distributed architecture" as used herein generally refers to a data architecture having a plurality of databases located at different computing resources, such that different users can access it without substantially interfering with one another.

Data that has been normalized by the normalization engine 115 and placed into the customer server 304 and storage area 306, may be processed to mine security data and generate security events. By "mining data" it is generally meant to look for patterns in a group of data. This mining may be used to discover patterns of potential malicious activity to generate security events. A data mining engine that resides with each client database 306 may be responsible for performing the data mining. Such distribution of data mining responsibility further adds to the scalability of the system and method according to the present invention. The data mining engines may execute a wide variety of automated requests for information, or queries, such as internal or native SQL queries, against the normalized data to identify individual records or patterns within the records which may be indicative of potential malicious activity. Single instances or unique patterns of malicious activity that are detected by the data mining engine may be termed sub-events. The data mining detecting for generating sub-events may include analyzing source and destination ports evident in firewall logs, analyzing sequences of connection information evident in firewall logs, and detecting excessive connection attempts to remote services, for example. Upon completion of the data mining process, within database 114, new security sub-events may be stored in a sub-event table in the customer database storage area 114 for further analysis.

A database loader may also run on customer database servers 114. The database loader pulls files from the normalization engine 115, and loads that data into the customer database 114. Each detected sub-event may be stored using database 306, for example, for further analysis. Events data correlated from sub-event data may be stored at database 306, for example, for further analysis.

Further, each customer or client may have its own dedicated configuration of client server 304, and/or client SQL database 306, or may share computing resources. However, where multiple customers share the capabilities of a single SOC, it may be desirable to effectively isolate one customer's servers 304 or database 306, or those corresponding to a particular client 102 or group of clients, from others so as to prevent a failure in one from collaterally affecting another customer's storage and analysis capabilities, for example.

Figure 3:
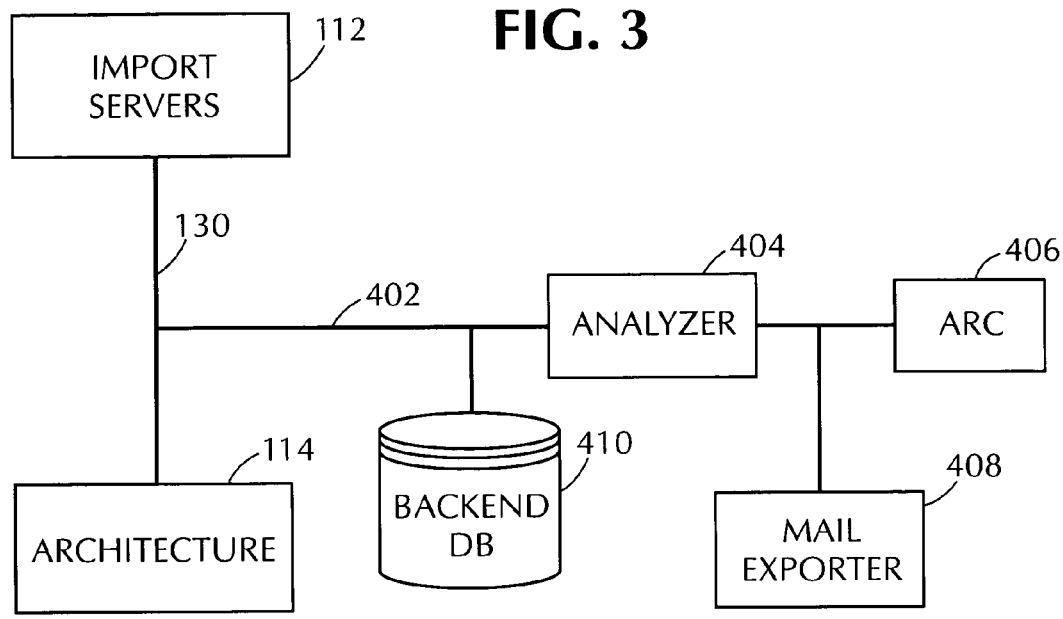
FIG. 3 illustrates a block diagram of a back-end zone of the system if FIG. 1.

Referring now also to FIG. 3, there is shown a block diagrammatic view of the basic functionality of back-end 116. Back end 116 may include, for example, hardware and/or software for enabling the analysis of log data communicated to the SOC 100, either automatically by using algorithms indicative of known attacks or by those possessing an ordinary skill in the pertinent arts, for example. Back end 116 may be communicatively coupled 130 to the customer database 114 and import servers 112. Back end 116 may include analyzer 404, back end database 410, analysis response console (ARC) 406 and mail exporter 408. At regular intervals, or upon demand for example, the analyzer 404 may correlate individual security sub-events, based on variety of factors. This correlation process may continuously reconstruct actual security events which are then reviewed and investigated by one or more security analysts through the ARC 406. The correlation may serve to link security sub-events based on the attack or activity type as well as the source and destination of the attack. As both imported data and sub-event data may be retrieved via the ARC 406, through this process, security analysts are able to view attacks in their entirety and associate related activities that occur at different locations throughout an organization's infrastructure using the ARC 406, for example. Correlated data may be stored in the architecture 114 by security analysts using the ARC 406.

Multiple pieces of evidence for attacks may be detected and analyzed from multiple client security devices, and then correlated in analyzer engine 404 and presented to analysts using the ARC 406 as a single security event. As set forth, due to normalization across differing device types for example, correlation may be performed across different products or for similar functions. For example, a service scan against one brand of firewall may be correlated with service scans across other brands of firewalls that have detected the same or similar activity. As an additional example, source IP address could be used as a correlation factor in sub-events that would originate from a single source. Additionally, correlation criteria may also include attack type, direction, source, and destination. Analysis may be performed using SQL queries to determine if data traffic patterns are suspicious. Well known pattern data may be used to match and/or correlate malicious activity. These patterns may be indicative of an individual who gains unauthorized access to a protected system, or pattern attack, for example.

An example of such a set of SQL queries to identify a threat may be as follows. First, a level 1 query may identify sub-events of interest. A second query level may correlate multiple sub-events and group them together. A third level query may trend sub-events according to time and device affected. A fourth query may trend the attack across business types, for example, financial institutions, and seek a broad spectrum pattern. If a broad spectrum pattern of attacks is detected, other customers corresponding to the identified broad spectrum pattern may be contacted to alert them to a potential security threat.

ARC 406 may take the form of a computing resource for monitoring and analysis by skilled analysts. The ARC 406 enables analysts to examine security events and eliminate obvious false positives and track security events that are of undetermined intent throughout the day. In addition, the ARC may allow analysts to drill down and perform custom queries on sub-events and view firewall logs that generated those sub-events. In addition, the ARC 406 may allow analysts to communicate comments and recommendations to the clients via the secure internet interface 118 of FIG. 1 and e-mail exporter 408, for example.

Recommended responses to security threat events may take several forms and be initiated at different levels. For example, an informational level may take the form of a posting to the secure network interface 118 or a publication in a weekly digest. This informational level of notification may include normal authorized daily traffic that may have malicious intent. An additional level of notification may take the form of a warning level. The warning level of notification may involve a posting to the secure network interface 118 and be the result of events occurring from normal scams and probes showing malicious activity. A critical level of notification may be a direct call to customers via pager or telephone. An e-mail may also be sent to the customer via e-mail exporter 408, in addition to posting to secure Internet interface 118 and daily and weekly digest insertions. An event may be posted to the secure Internet interface 118, regardless of the threat level, as well.

Figure 3A:
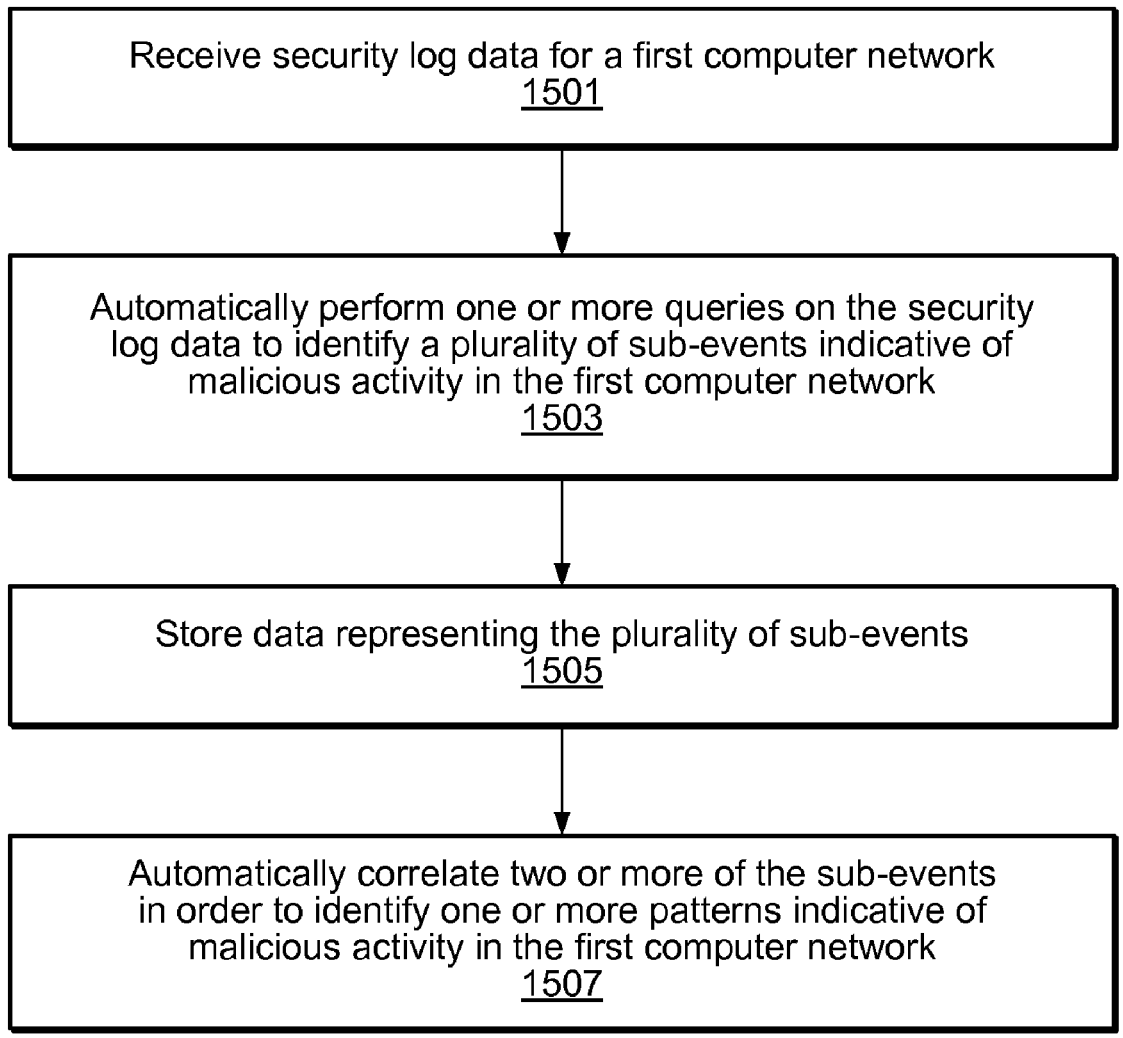
FIG. 3A illustrates a flowchart for identifying one or more patterns indicative of malicious activity in a computer network.

FIG. 3A illustrates a flowchart for identifying one or more patterns indicative of malicious activity in a first computer network. In block 1501, security log data for the first computer network is received. In block 1503, one or more queries are automatically performed on the security log data to identify a plurality of sub-events indicative of malicious activity in the first computer network. In block 1505, data representing the plurality of sub-events is stored. In block 1507, two or more of the sub-events are automatically correlated in order to identify one or more patterns indicative of malicious activity in the first computer network.

As set forth, a system according to the present invention may support a variety of external customer devices. According to an aspect of the present invention, three methods of transporting log data into the SOC may be supported: a remote agent 108, which brings data directly to the SOC import servers 112; a syslog client which supports standard logging, such as the output from Pix or NetScreen, sends data via a syslog to a central server 106, which central server 106 then moves the data to the SOC import servers 112; and vendor-specific, proprietary protocol related devices, which use proprietary logs such as ISS or Dragon logs, and which gather logs from a plurality of client security devices into a central server 106 before importing them to import servers 112 of the SOC. According to an aspect of the present invention, regardless of the method chosen, a remote agent 108 may ultimately transfer the log data to import servers 112 of the SOC 100.

The remote import process may open a File Transfer Protocol (FTP) connection with a SOC import server 112, log into the import server 112 using a shared username and password, and put files into a directory. However, because FTP may not encrypted, passwords and usernames may be exposed and stolen by a third party using conventional traffic monitoring techniques. Hence, unauthorized individuals may have the potential to access client security device 104 logs. While conventional steps may be taken to prevent downloading of files, third-parties may be able to download false files, thereby potentially damaging data integrity and processing.

Referring again to FIG. 1, a method for limiting exposure of log data may be adopted as follows. As set forth, log data is transmitted between a client 102 and import servers 112. This transmission of data, between a remote agent 108 and the SOC 100 for example, may be performed in a secure manner. For example, a secure transmission path 128, such as a Virtual Private Network (VPN) may be provided, such as by using network 110, such as the Internet, as a data transportation medium, and by using encryption and other security mechanisms known to those skilled in the art. Data may be transported from the security device 104, such as by the remote agent 108, to the SOC, over the network 128, such as by using file transfer protocol ("FTP"). Network 128 may employ any suitable method for frustrating unauthorized interception of, access to or spoofing of data.

The Analysis Response Console (ARC) 406 provided in the backend 116 may have hooks for viewing key information for a device as well as current lockout counts and audit logs. Additionally if a key pair needs to be recreated for a customer, the configuration of the device to allow key overwrite may be performed through the ARC 406. ARC 406 may take the form of an application that provides the ability to mark key pairs to allow overwriting so that devices that need to have the key pairs replaced will be handled correctly by the key enrollment CGI. Additionally, the ARC 406 may provide access to the audit logs for the import servers and for the specific device interactions. This audit data may be retrieved from the key management data store, e.g. keymaster database 430. Finally, the ARC 406 may allow analysts to view and verify the public keys and enrollment signatures for a device.

Figure 4:
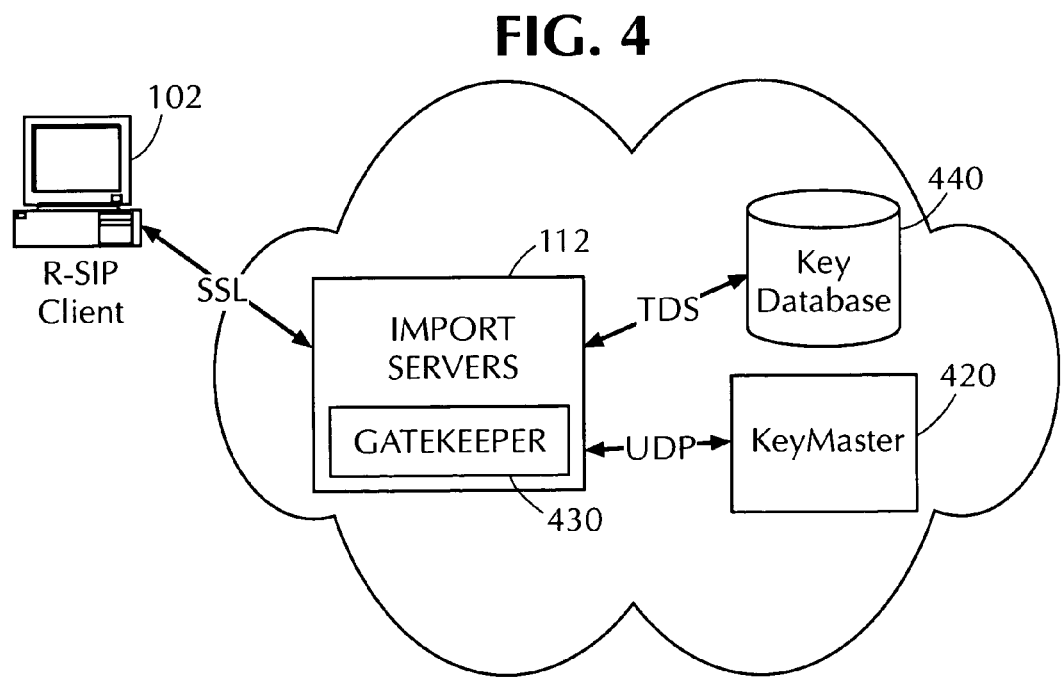
FIG. 4 illustrates an import service providing system according to an aspect of the present invention and being suitable for use with the system of FIG. 1.

This aspect of the present invention data transmission may be provided where the data is verified to come from a trusted source and checked for corruption in transit. Referring now also to FIG. 4, there is shown a block diagram of an import service providing system 400 according to an aspect of the present invention. The system 400 includes import servers 112 which receive security log data from clients 102. The system 400 further generally includes a keymaster key management service 420, gatekeeper 430 and key management store, or database 440. Inbound client connections are accepted and handled on the import servers 112. According to an aspect of the present invention, import server 112 may operate akin to the Apache® WebServer Daemon, for example. Of course, a "daemon" may be thought generally of as an application, agent, program or process that performs a specified procedure at predefined times or in response to certain events, for example.

The gatekeeper 430 may take the form of a daemon operating on each of a plurality of import servers 112 and serve to keep key information stored locally up to date and substantially synchronized with other import servers 112. The gatekeeper 430 may notify the keymaster 420 when a key change has been made, so keymaster 420 can propagate these changes to other import servers 112, and hence other gatekeepers 430. When a gatekeeper 430 receives a key update message, it may copy the contents of the key into the local cache directory, overwriting the key if it already exists. This allows update keys to be available to Common Gateway Interface (CGI) systems, for example. In addition to getting event based key updates, the gatekeeper 430 may periodically access the key management data store 440 and refresh an entire local key set based on what is stored there.

The gatekeeper 430 may further aggregate and centralize import system auditing data from the import servers 112 to the key database 440 to make it accessible to the ARC 406, for example. Keymaster 420 may copy the customer public keys to each gatekeeper 430. Keymaster 420 may further send update information to each gatekeeper 430 when keys change. Consistently with FIG. 1, one or more import servers 112 may be communicatively available to client 102 via an SSL protocol. Gatekeeper 430 may be communicatively coupled to key database 440 via a Tabular Data Stream (TDS) link. Additionally, gatekeeper 430 may be communicatively coupled to keymaster 420 via a User Datagram Protocol (UDP) based message protocol.

Keymaster 420 may reside on a key management data store 440, such as database 440 and provide a central service for maintaining key caches on each of the import servers 112. To provide this support, keymaster 420 may accept update requests from gatekeepers 430 each running on a corresponding import server 112 or group of import servers 112, and propagate the key throughout the system 400, i.e., to other import servers 112 for example. When a new key is enrolled, or a key is submitted for update, keymaster 420 may update the other gatekeepers.

According to an aspect of the present invention, gatekeeper 430 and keymaster 420 may read configuration information from the database 440 data store so that the configuration data can be easily updated for an entire array of import servers 112. Configuration options that may be made in the data store 440 may include replay attack threshold, key refresh interval, and the lock out threshold counts, for example. Alternatively, gatekeeper 430 and keymaster 420 may read configuration data from a local configuration file.

According to an aspect of the present invention, authentication of devices sending log data and validation of the data itself upon receipt by the import server 112 may be achieved. According to an aspect of the present invention, transmissions may be encrypted so customer data and SOC resources may be protected. According to an aspect of the present invention, specified devices, such as devices 104, may send data files to an import server 112. According to an aspect of the present invention, a substantially stateless transfer protocol that allows the import servers 112 to be arrayed behind a load balancing system or virtual Internet Protocol (IP) system may be achieved. According to an aspect of the present invention, authentication of the SOC from remote clients 102 to protect against a third party impersonating the SOC may be provided.

Authentication of client systems may be provided through the use of any suitable technique, such as DSA public key algorithms. The use of a public key cryptographic system allows a unique identification to be associated with each of the client security devices in the system. The use of the DSA algorithms restricts the cryptography based on this key pair to signing of data, such that recovery of signed data is not possible and thereby requires transmission in the clear of the data that was signed. Other suitable algorithms may be used as well though.

According to an aspect of the present invention, an application may be created around the stateless transfer protocol of the present invention. Such an application may be combined with other applications and computing systems and networks such that many of the advantages of the present invention may be realized beyond a managed computer network security system.

Referring now also to FIG. 5, there is illustrated a block diagrammatic view of a method 500 according to an aspect of the present invention. A client 102 may generate 510 a private/public key pair for the device. The client 102 may then submit 520 its public key to the SOC through an automated enrollment system, e.g., transmit the key 525, and receive a confirmation 550 that the key was received and accepted 530 by the SOC which submits 545 the confirmation to the client 102. In each subsequent transaction, the client 102 may sign a block of information, e.g., create a signature, 560 about log data being sent with the private key corresponding the accepted public key, and submit the log data and signed block 570 by transmitting the same 575 to the SOC. This signature may be verified by an import server 112 and used to authenticate 580 that the client 102 sending the log data is a valid client 102, and that the log data itself actually came from the signing client 102 and is in a substantially unaltered state using conventional techniques well understood in the pertinent arts.

Figure 6:
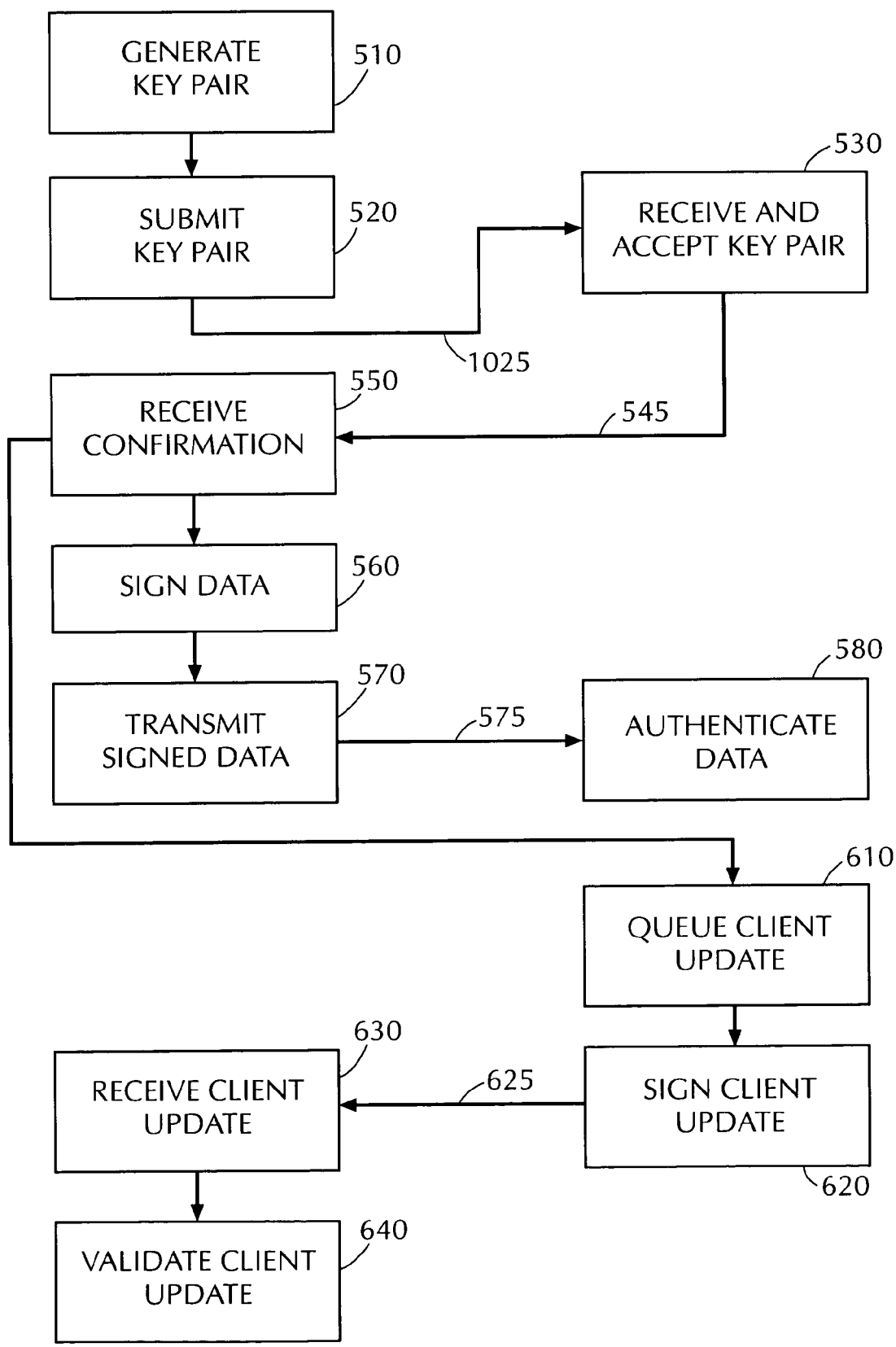
FIG. 6 illustrates a functional block diagram of a method according to an aspect of the present invention and being suitable for use with the system of FIG. 1.

Referring now to FIG. 6, there is shown a diagrammatic view of a method according to an aspect of the present invention. Again, a client 102 may generate 510 a private/public key pair for the device. The client 102 may then submit 520 its public key to the SOC through an automated enrollment system, e.g., transmit the key 525, and receive a confirmation 550 that the key was received and accepted 530 by the SOC submits 545 the confirmation to the client 102. In each subsequent transaction, the client 102 may sign a block of information, e.g., create a signature, 560 about log data being sent with the private key corresponding the accepted public key, and submit the log data and signed block 570 by transmitting the same 575 to the SOC. This signature may be verified by an import server 112 and used to authenticate 580 that the client 102 sending the log data is a valid client 102, and that the log data itself actually came from the signing client 102 and is in a substantially unaltered state using conventional techniques well understood in the pertinent arts. Further, the SOC may queue 610 an update for one or more clients 102. According to an aspect of the present invention, the update may be an application, agent daemon or software update or any other data, such as for the remote agent 108 application for example (all being collectively referred to as an "update" herein). The SOC may then sign one or more of the queued updates 620 and transmit 625 the signed update to one or more predetermined clients 102. The one or more clients 1-2 may receive the signed update 630 using the key pairing heretofore described. A receiving client 102 may then validate the received update 640 using the key pairing heretofore described.

For example, clients 102 may authenticate connections to import servers 112 based on server certificates of the Secure Socket Layer (SSL) sessions. This allows clients to verify that the transmission as received originated with the SOC, and not a third party attempting to impersonate the SOC. The SSL authentication certificates for the SOC, such as certificates which may be associated with one or more import servers 112, may be maintained in a conventional manner, such as through the use of commercial trusted Certificate Authorities (CAs) such as Verisign or Thawte.

According to an aspect of the present invention, encryption may provide data confidentiality, while still allowing flexibility in the client and server application, as well as limited overhead for performing the encryption. To meet these needs, data may be encrypted using the SSL encryption standard, or any other suitable method, as is understood by those possessing an ordinary skill in the pertinent arts.

Figure 7:
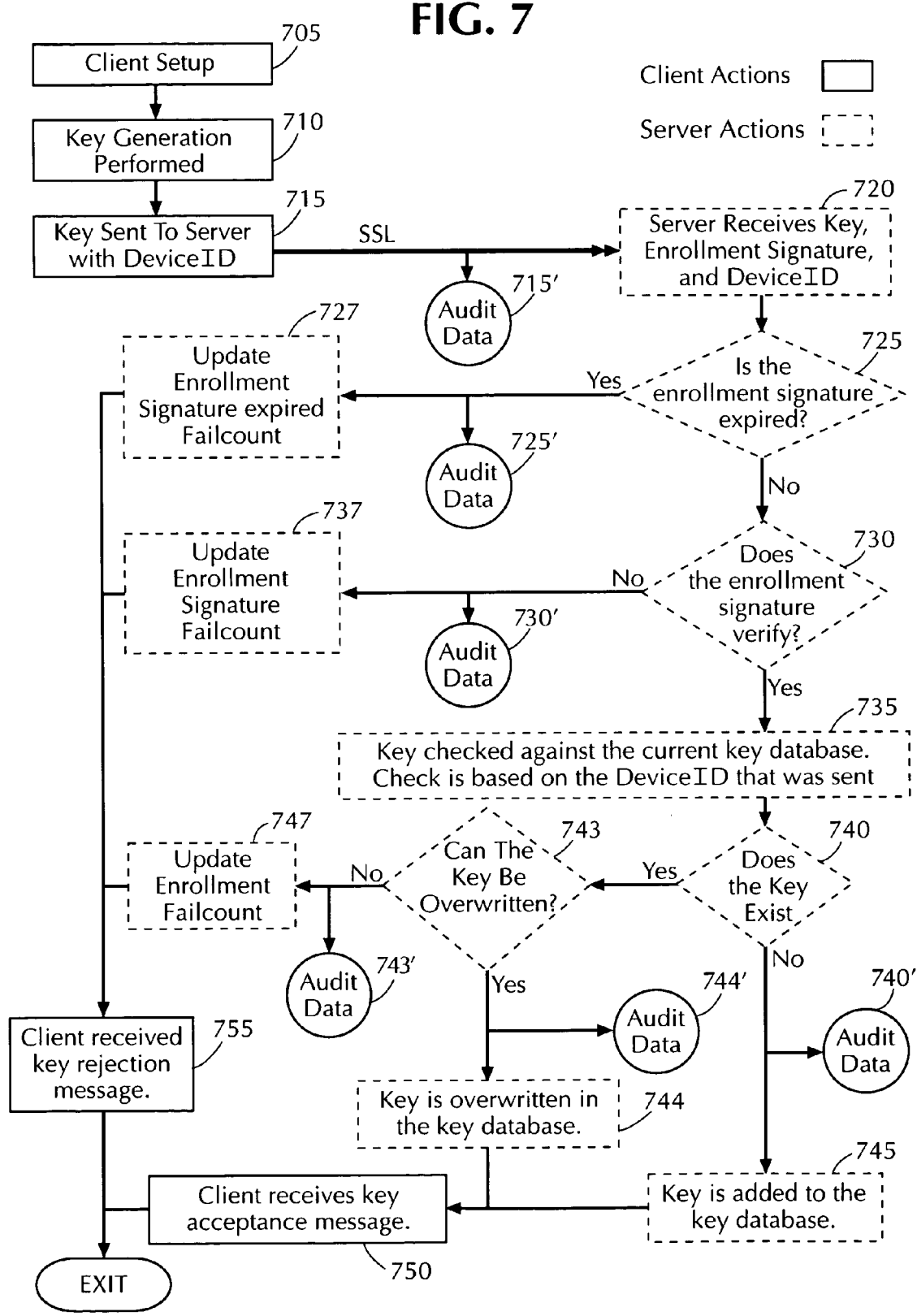
FIG. 7 illustrates a functional block diagram of a key enrollment method according to an aspect of the present invention and being suitable for use with the system of FIG. 1.

Referring now also to FIG. 7, there is shown a block diagrammatic view of a key enrollment process between a client 102 and SOC 100 according to an aspect of the invention. The enrollment of a key at initial client security device 104 setup may be performed from the client security device 104 as a part of the installation and setup 705 of a client 102. The authentication processes may be defined around the use of a public/private key pair that is generated 710 using client 102 and shared with the SOC 100. The generation 710 of the key pair may involve an installer being prompted to provide randomized seeding data to the installation routine, for example. A scheme for ensuring randomness may be modeled after the Pretty Good Privacy (PGP) implementation and is well understood by those possessing an ordinary skill in the pertinent arts. Once sufficiently random seeding data is acquired, a public/private DSA key pair may be generated 710.

After a key pair is generated 710, the application may then upload 715 the public key to a key enrollment CGI on one or more of the import servers 112 in the SOC 100. This upload may be performed via an SSL link. This enrollment from the client 102 may be authenticated based on the submission of an enrollment signature, which will be provided to the installer at the same time a device identification (DeviceID) for the device is provided, for example. The enrollment signature may take the form of a DSA signature of the DeviceID that the installer is working with, and the timestamp when the enrollment signature was created. This information may be signed with the SOC's private key such that import servers 112 can validate it when it is uploaded. This enrollment signature gives the added security of protecting the key enrollment system from denial of service (DoS) where large blocks of nonexistent devices could have keys enrolled, thereby stopping the addition of legitimate devices with corresponding DeviceIDs to the system. An enrollment signature may have only a limited lifetime where it is valid for enrollment use. Each enrollment signature may be assigned an expiration time when the enrollment signature is created. Any enrollment requests made after this time with this enrollment signature may be rejected. A make up of an enrollment signature suitable for use with the present invention is shown in FIG. 8.

Figure 8:
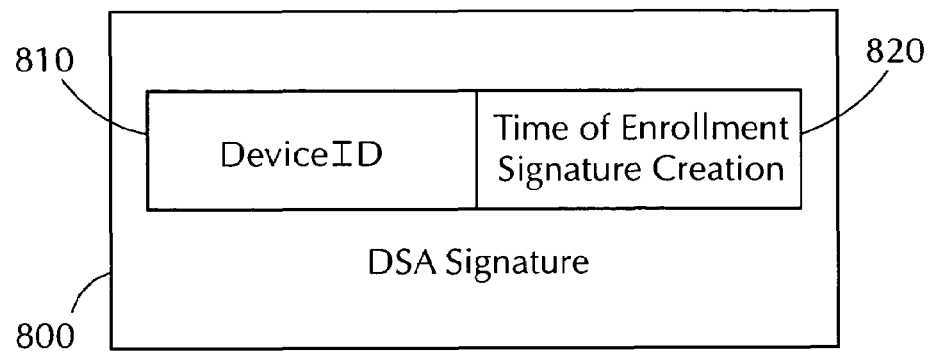
FIG. 8 illustrates a datagram of an enrollment signature according to an aspect of the present invention and being suitable for use with the method of FIG. 7.

Referring now to FIG. 8, there is shown a datagram of an enrollment signature 800 according to an aspect of the present invention. The enrollment signature 800 may include a DeviceID field 810 and a field 820 indicative of a time of enrollment signature creation, and may further be signed using a DSA signature, as is well understood by those possessing an ordinary skill in the pertinent arts.

Referring again to FIG. 7 and FIG. 8, for ease of verbal verification with the SOC 100 for example, the remote agent 108 may output data analogous to a fingerprint of the enrollment signature that may consist of a series of alphabetical letters.

The enrollment of the key in a key management data store, e.g. database 440, may be handled by the enrollment CGI on the import servers 112. The enrollment may take place after a client 102 submits the public key, the DeviceID, the enrollment creation time, and the enrollment signature. After the information has been received 720, the server will first validate 730 the enrollment signature with the deviceID that was sent, and the timestamp of the enrollment signature generation (which may include checking to see if the key has expired 725). This timestamp may be available to the servers in the key management data store (database 440). If the signature validates 730 with the SOC public key then the server 112 may continue to process the key, otherwise a key rejection will be sent to and received by the client 102 (step 755) and the enrollment processing on the server 112 may stop. Once the enrollment has been validated 730, the server 112 may check in the key management data store, e.g., database 440, to see if the DeviceID that was sent already has a public key 735, e.g., in the database 440. If it is determined that there is an existing key 740, the CGI may determine whether the existing key may be overwritten 743. If the key may be overwritten 743, the key may be overwritten in the database 440 (step 744), e.g., by overwriting the public key and the deviceID in one or more appropriate tables. If the key may not be overwritten 743, a key rejection may be sent to and received by the client 102 (step 755) and the enrollment processing on the server may stop. If it is determined that there is not an existing key 740 for the device then the server may register the key in the database 440 by inserting the public key and the deviceID into the appropriate tables 745. If the key has been registered 744, 745, the client 102 may receive a key accepted message 750.

According to an aspect of the present invention, each time a key is rejected, the SOC may increment a key enrollment failure count 727, 737, 747 in the data store and send a key rejection to be received 755 by the client 102. Such a counter allows a system operator to watch for abuse or attempted exploitation of the key enrollment system, for example.

In the case of a central server 106 reporting device 104 type, the central server 106 may hold private keys for all of the devices 104 that report through it. In other words, the key generation process may be iterated for each of the devices 104 reporting through a centralizing device 106, and any new device 104 added to report through it.

Once the initial key enrollment is complete, uploading and downloading of data with the SOC 100 can take place using the accepted key. For devices that are processed through a centralizing system 106, the centralizing system 106 may perform the signing and transmission of log data. However, it should be understood that the files may still be treated as though they come from a stand-alone client security device 104 though, since they may be signed and sent with the specific DeviceID of the originating client security device 104.

According to an aspect of the present invention, one or more of these steps may be audited, such as by making appropriate entries in an audit log for example. The CGI may locally log auditing data for aggregation to the key management data source, e.g. database 440, thus providing a central location for log review and auditing. Audit messages may include the timestamp of the action or error being audited, the server name of the import server, the local IP address of the server, and the DeviceID if applicable to the audit record. For the key enrollment process, the following events may be audited: new key enrollment; expired enrollment key attempt; failed key enrollment because of enrollment signature verification error; Failed key enrollment because of key duplicate; key overwrite request; update of key enrollment failure count; improper submissions of key enrollment data either incorrect types of parameters or invalid values for parameters; and errors encountered by the server, for example. Examples of some suitable audit points are represented in FIG. 7 with "" designations for sake of non-limiting illustration only.

Figure 9:
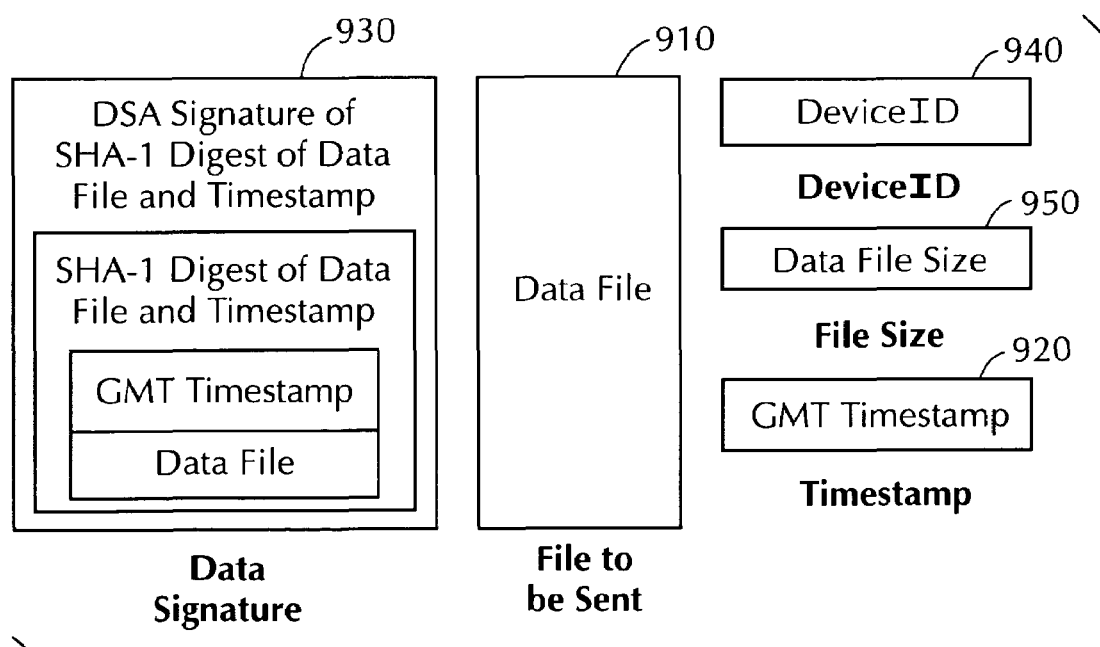
FIG. 9 illustrates a block diagram of data types which may be transmitted according to an aspect of the present invention and being suitable for use with the method of FIG. 7.

Referring now to FIG. 9, there is shown a block diagrammatic illustration of data which may be uploaded to the SOC 100 from a client 102. Actions, e.g., transmissions, from the client 102 other than key enrollment may be authenticated using the DSA public key signing process, for example. As such, the import process can be broken down to authentication and then data transfer. An SHA-1 hash of the file to be sent 910 may be calculated and after being combined with current timestamp 920, signed by the client 102. The timestamp may be a Greenwich Mean Time (GMT) timestamp, for example. This signature 930 may be transmitted as the data signature to assist the import server 112 to authenticate the client 102. According to an aspect of the present invention, the client 102 may send the server 112 the data signature 930, DeviceID 940, data file 910, GMT timestamp 920, and the file size 950 of the data file 910. The file size 950 may be sent as a parameter to allow an import server 112 to quickly find the end of the file, since the file data may be binary in form, which may make searching for field delimiters otherwise time-consuming and resource intensive.

Figure 10:
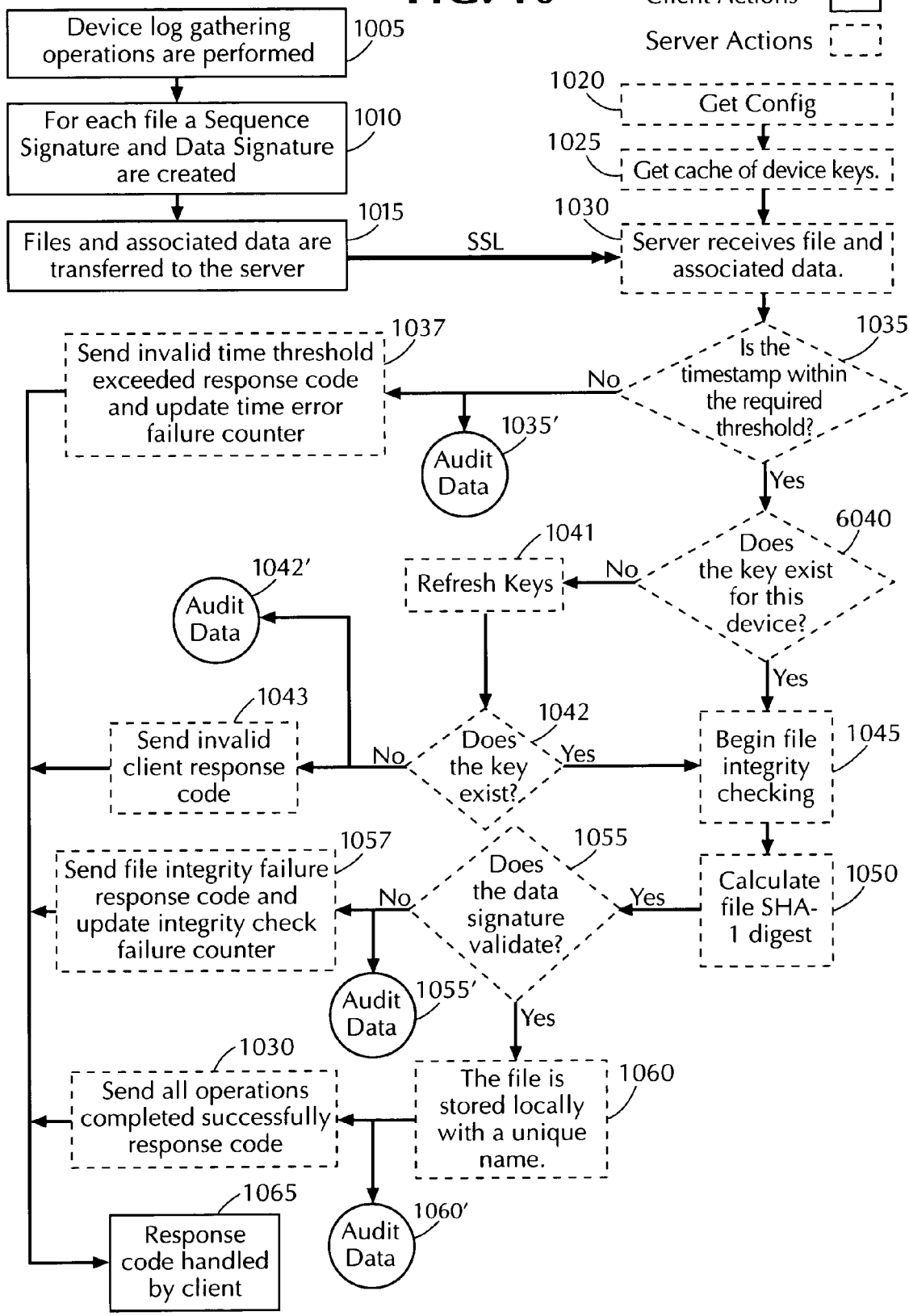
FIG. 10 illustrates a functional block diagram of a data import method according to an aspect of the present invention and being suitable for use with the system of FIG. 1.

Referring now to FIG. 10, there is shown a diagrammatic view of a data import process according to an aspect of the present invention. A client 102 may gather a data log file for transfer to the SOC 100 (step 1005). The authentication of a client 102 when requesting to import a file may be based on the ability to verify a signature of a block of data that has been signed with the client's private key. For up-load authentication the client 102 may sign the log file and the timestamp. For example, sequence and data signatures may be created for the gathered data 1010. This may be used to verify the integrity of the data that is sent from the client 102 and to protect against timestamp-based replay attacks, for example. The signature, file and other data referenced with regard to FIG. 9 for example, may then be transmitted to the SOC 100 (step 1015), via an SSL link for example. The authentication of the client 102 may be based on the DeviceID that is received by the server 112 in step 1030. With this DeviceID, an import server 112 may retrieve the public key for an originating device 104, and validate the data signature by confirming the clear text timestamp that was sent is correct and was signed with the key corresponding to the device 104. If a public key for the DeviceID is not in the local server cache that was retrieved 1025, the server may attempt to retrieve the key from a key management data store, e.g., database 440 (step 1030). If the key is still not available, the client 102 request may be rejected with a response code indicating that the client 102 is invalid.

Once the client 102 has been authenticated, the uploaded log file may begin to be processed. A server 112 may rule out the possibility of a replay attack by comparing the timestamp 920 that was sent with the file 910 to the local server time (step 1035). If the difference in time is over a replay threshold of the server 112 then the import may be rejected 1037 and the client 102 sent a response code received by it indicating that the time threshold was exceeded for handling by the client 102 (step 1065).

After the replay check has been passed 1035, the server 112 may proceed to verify the integrity of the actual data file 910. The server 112 may search the key data store, e.g. database 440, to determine whether a key exists for the device 1040. If a key does not exist, the key list may be refreshed 1041 using conventional methodology and data in key stores corresponding to other import servers 112, for example. Thereafter, the key store may again be checked 1042 to determine whether a key exists for the device. If not, a failure response code 1043 may be sent to the client 102. If a key is found to exist 1040, 1042, integrity of the file may be verified 1045, such as by calculating the SHA-1 of the submitted file 1050 and then validating 1055 this SHA-1 digest matches the data signature that was sent by the client 102. If the signature does not validate 1055 the client 102 may be sent a response code 1057 indicating that the file integrity check failed. If the file integrity passes 1055, the server 112 may proceed to save the file 1060 to the local file system, for retrieval by the SOC 100 and normalization by the normalization engine 115, for example. After completing the processing of the data, the server 112 may send a response code 1030 to the client 102 indicating that all operations were performed successfully.

Regardless of what file name the client 102 sends, the server 112 or database 114 may generate a new name for the file 910, to ensure the name is sufficiently unique and will not cause other files to be unintentionally overwritten. This filename generation may serve to substantially prevent name collisions across import servers 112, while still use the generation of a temporary name to limit the success of replay attacks. The filename may be created using the SHA-1 digest of the log file 910, and take the following form: <DeviceID>-<ServerCode>-<FileSHA1>.Igz.

The following non-limiting and exemplary response codes show what may be sent to the client 102 depending on the results of the authentication and integrity checking performed by an import server 112.

TABLE 1

| Code | Description |
|---|---|
| 0 | All operations completed sucessfully. |
| 1 | INVALID CLIENT—No key was available |
| 2 | INVALID SIGNATURE—The client could not be authenticated. |
| 3 | TIME THRESHOLD EXCEEDED—The timestamp exceeded the servers acceptable skew. |
| 4 | INVALID FILE—The file integrity check failed. |

Again, the CGI may locally log auditing data for aggregation to the key management data source, e.g. database 440, thus providing a central location for log review and auditing. Audit messages may include the timestamp of the action or error being audited, the server name of the import server, the local IP address of the server, and the deviceID if applicable to the audit record. According to an aspect of the present invention, the following data import process events may be audited: submission of data for upload (who, when, where); client requests that do not have a valid key; data signature validation failures; time threshold exceeded failures; file integrity failures; successful storage file and completion of import process; and errors encountered by the server. Examples of some suitable audit points are represented in FIG. 10 with "" designations for sake of non-limiting illustration only.

Figure 11:
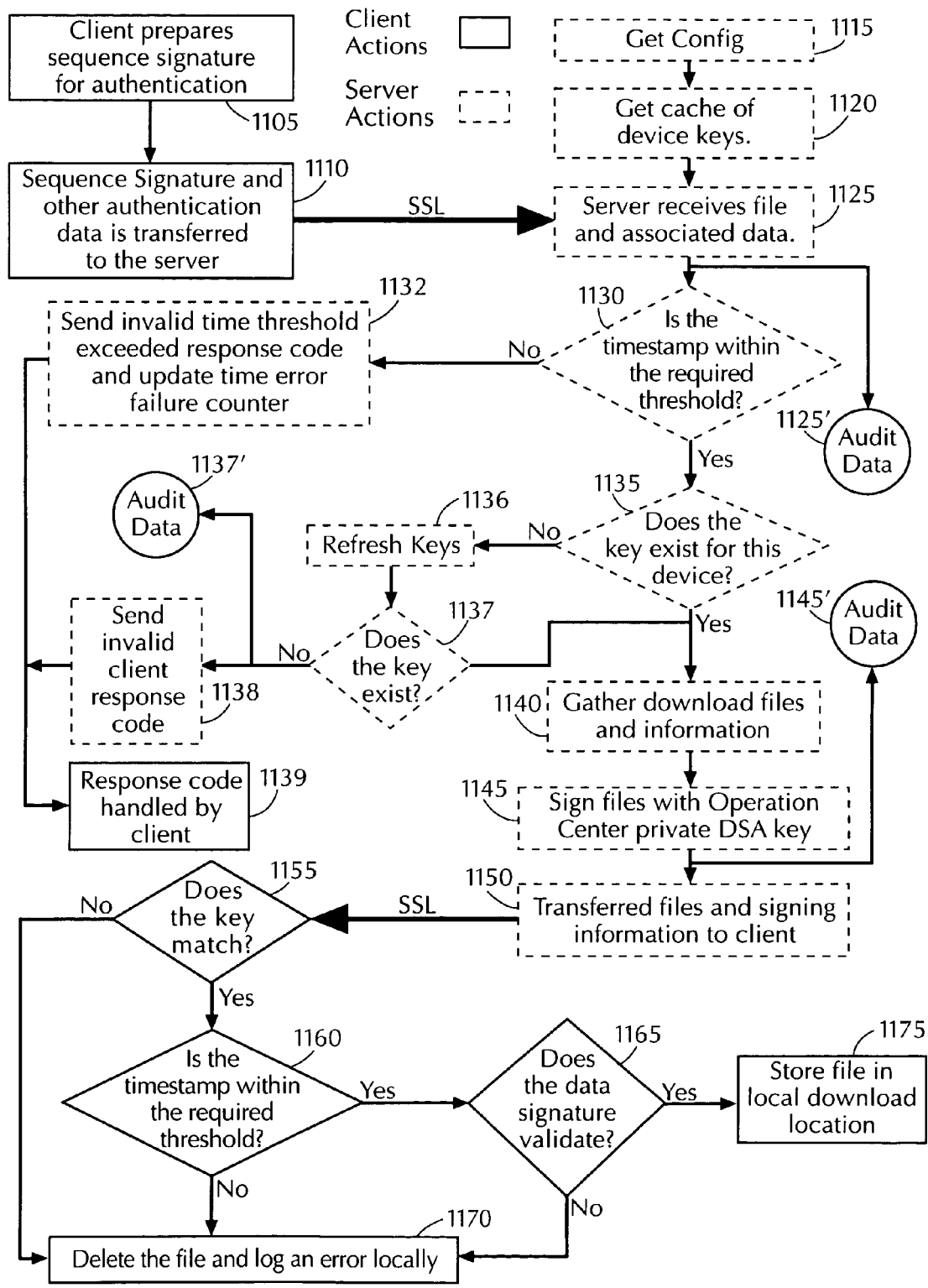
FIG. 11 illustrates a method according to an aspect of the present invention and being suitable for use with the system of FIG. 1.

Referring now to FIG. 11, there is shown a diagrammatic view of a process according to an aspect of the present invention being suitable for allowing clients 102 to download data from the SOC 100 in a secure manner so as to allow for remote software configuration changes, software updates, and other processes that requires data to be transferred to one or more clients 102. According to an aspect of the present invention, files to be transferred may be sent to the client 102 that should receive them, and be verifiable as having come from the SOC 100. As with security log data import, the process may include authentication, data transfer, and auditing.

According to an aspect of the present invention, authentication of clients 102 for downloading software may use an analogous methodology to the log data importing, or upload, process previously discussed. Authentication may again be based on signing of data by the client 102 followed by validation of the signature by a server 112. Since a client 102 is not transmitting data to the server 112 in this process, for example, the client 102 may merely sign a timestamp, such as a GMT timestamp, that it is going to send. The client 102 may prepare a sequence signature 1105 for transmission to the SOC 100. The client 102 may send the GMT timestamp, the sequence signature and the DeviceID to the SOC (step 1110).

Figure 12:
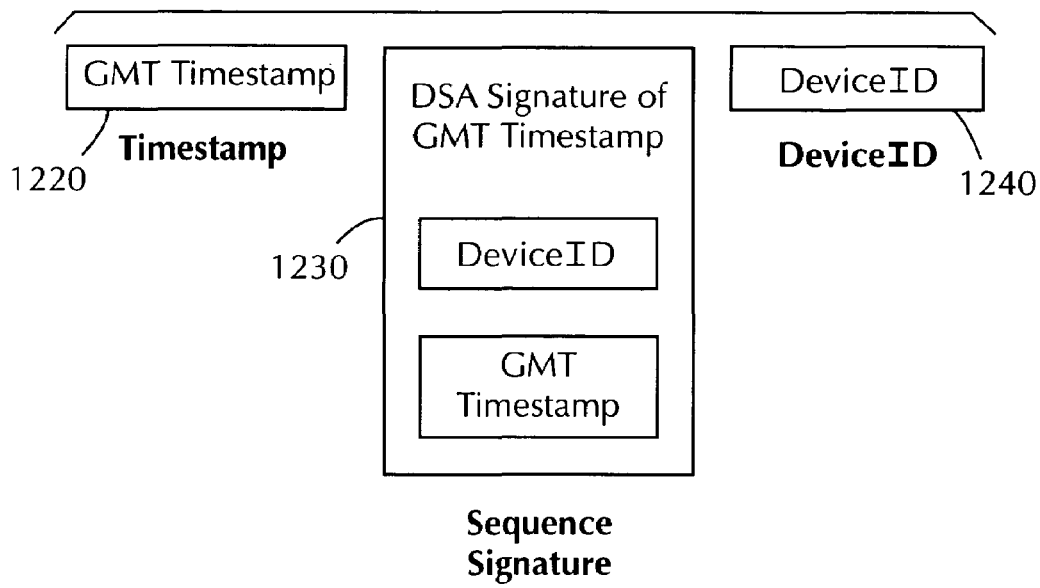
FIG. 12 illustrates a block diagram of data types which may be transmitted according to an aspect of the present invention and being suitable for use with the method of FIG. 11; and, FIG. 13 illustrates a block diagram of data types which may be transmitted according to an aspect of the present invention and being suitable for use with the method of FIG. 11.

Referring now to FIG. 12, there is shown a block diagrammatic illustration of data which may be uploaded to the SOC 100 from a client 102. An SHA-1 hash of the deviceID 1210 and timestamp 1230 to be sent 1210 may be calculated and after being combined with the timestamp 1230, signed by the client 102. The timestamp may be a Greenwich Mean Time (GMT) timestamp, for example. This signature 1230 may be transmitted as the sequence signature to assist the import server 112 to authenticate the client 102. According to an aspect of the present invention, the client 102 may send the server 112 the sequence signature 1230, DeviceID 1220 and GMT timestamp 1210.

The server 112 may retrieve a cache of public keys in a corresponding memory device 1120. Once all three pieces of information transmitted 1110 have been received 1125, the server 112 may attempt to retrieve the public key for that device from the cached keys, and then validate the sequence signature by confirming that the clear text timestamp that was sent is correct and was signed by the device using the retrieved key. If a public key for the DeviceID is not in the local server cache, the server 112 may attempt to retrieve the key from the key management data store, e.g., database 440. If the key is still not available, the client 102 request may be rejected with a response code indicating that the client 102 is invalid. The server 112 may also update the appropriate failure counters so counts are global across the SOC, for example.

If the sequence signature fails to validate, the server 112 may reject the export request and respond to the client 102 with a failure code indicating that the signature could not be validated. If the sequence signature does validate then the client 102 may be authenticated.

Once the client 102 is authenticated, the server 410 may check to make sure that the timestamp passes the test for replay protection. If the timestamp is determined to fail to satisfy a threshold 1130, such as 300 seconds, the server 112 may reject the export request by sending a standard HTTP protocol 404 file not found error, and may send a failure message 1132 to be handled by the originating client 102 (step 1139), for example. This failure message may indicate that an invalid timestamp has been received—inasmuch as it exceeds a time threshold, for example. If the timestamp that was submitted is determined to be within the threshold 1130, it may be determined whether a key corresponding to the received information 1125 exists 1135. If not, the store of keys may be refreshed 1136, and checked again 1137. If a key is still not found to exist 1137, a failure response may be sent to the originating client 102 (step 1138) and handled by the client 102 (step 1139).

If a key is found to exist 1135, 1137, server 112 may begin determining and queuing files for transmission to the client 102 (step 1140). Determining 1140 what files to send the client 102 may include a data lookup to the key management data store, e.g. database 440. Information may be stored on a per device 104 basis as a listing of files that currently need to be sent to clients 102, for example. This data structure may include the filename that should be transferred, path information to where the server 112 can find the file, which device the file or files are destined for, and a bit, or flag, to indicate if the file or files have been transferred to the client 102, for example.

Figure 13:
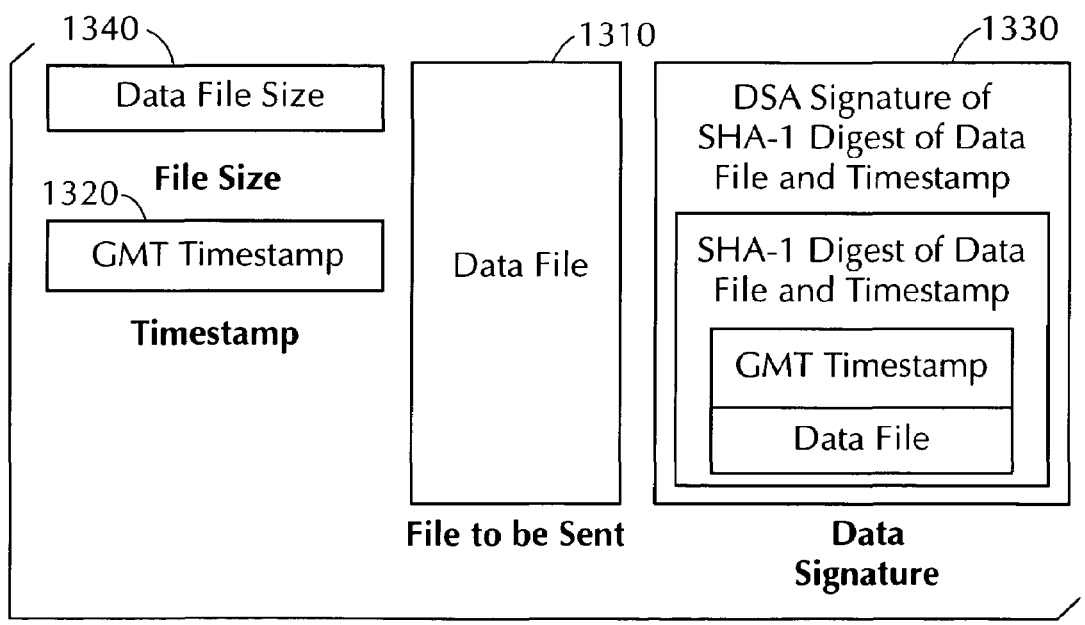

Once files that are effectively queued to be sent to a client 102 have been determined, the server 112 may go through the process of signing them 1145 for transmission to a corresponding client 102 (step 1150). This may be analogous to the process the client 102 performs when uploading log data, with the roles being reversed. To sign the files, the server 112 may use a private DSA key corresponding to the SOC or server 112, for example. To sign the files 1140, the server 410 may first calculate an SHA-1 digest of each of the files to be downloaded and append the current GMT timestamp. This block of data may then be signed with the SOC private key. FIG. 13 illustrates data that may be included with such a message.

Referring now to FIG. 13, there is shown a block diagrammatic illustration of data which may be downloaded from the SOC 100 to a client 102. Actions, e.g., transmissions, from the SOC 100 may be authenticated using the DSA public key signing process, for example. As such, the export process can be broken down to authentication and then data transfer. An SHA-1 hash of one or more files to be sent 1310 may be calculated and after being combined with a current timestamp 1320, signed by the server 112 using a private DSA key corresponding to SOC 100. The timestamp may be a Greenwich Mean Time (GMT) timestamp, for example. This signature 1330 may be transmitted as the data signature to assist the client 102 to authenticate SOC 100. According to an aspect of the present invention, SOC 100, using a server 112, may send the client 102: the data signature 1330, data file 1310, GMT timestamp 1320, and the file size 1340 of the data file 1310 as a multi-part form response, for example. The file size 1340 may be sent as a parameter to allow a client to quickly find the end of the file, since the file data may be binary in form, which may make searching for field delimiters otherwise time-consuming.

Referring again to FIG. 11, when a client 102 receives a file, a signature verification of the data may be attempted. A first check may be to see if a memory instance of the key exists and matches 1155. If not, the transmitted file may be deleted and an error logged 1170. Otherwise, next the timestamp that was sent may be checked to determined if it is within the replay threshold for the client 102 (step 1160). If it is, the client 102 may next calculate the SHA-1 digest of the data file that was sent and append the received timestamp. Once this digest is prepared, the client 102 may then validate 1165 the signature for the file with this data block and the client 102 copy of the SOC's public key.

If the file does not validate, the client 102 may delete the file and log an error locally indicating that an invalid file was received 1170. If the file does validate correctly, the client 102 may save the file locally 1175 and then the rest of the client application may perform whatever work this file requires, for example. According to an aspect of the present invention, work done with a delivered and stored file may be performed independently at the client 102. According to an aspect of the present invention, the remote agent 108 may be adapted to use such files to perform functionality at the client security device 104. For example, if an update is determined to fail, the remote agent may trigger a roll back to a previous operational revision using conventional methodology to permit operability even in the event of a failure of an update.

Again, the CGI may locally log auditing data for aggregation to the key management data source, e.g. database 440, thus providing a central location for log review and auditing. Again, audit messages may include the timestamp of the action or the error being audited, the server name of the import server, the local IP address of the server, and the DeviceID if applicable to the audit record. For the data export process, the following events may be audited: submission of data for upload (who, when, where); client 102 requests that do not have a valid key; sequence Signature validation failures; time threshold exceeded failures; file information for download that are being processed; any errors encountered by the server. Again non-limiting audit points have been designated with a "" designation in FIG. 11 for purposes of illustration only.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A method comprising:
   an operations center establishing authentication information associated with a first computer network security device, wherein said first computer network security device is located within a first computer network and is configured to generate security log data for said first computer network;
   said operations center receiving said security log data in data transmission from said first computer network security device, wherein said operations center is configured to monitor security of a plurality of computer networks, wherein said receiving said security log data comprises receiving a signature generated by said first computer network security device;
   said operations center authenticating said data transmission using said authentication information, wherein said authenticating comprises determining whether a timestamp associated with said received signature has expired; and
   said operations center analyzing said security log data to monitor security of said first computer network, wherein said analyzing comprises:
      automatically performing one or more queries on the security log data to identify a plurality of sub-events indicative of malicious activity in said first computer network;
      storing data representing the plurality of sub-events; and
      automatically correlating two or more of the sub-events in order to identify one or more patterns indicative of malicious activity in said first computer network.

2. The method of claim 1, wherein said authentication information comprises an authentication key.

3. The method of claim 1, wherein said authentication information comprises a public key of a public/private key pairing.

4. The method of claim 1, wherein said establishing comprises generating a seed value.

5. The method of claim 1, wherein said establishing comprises generating a pair of authentication keys.

6. The method of claim 1, wherein establishing said authentication information comprises said operations center receiving and storing said authentication information prior to receiving said security log data.

7. The method of claim 1, wherein said security log data received by said operations center is signed with a private key, wherein said authenticating said data transmission using said authentication information comprises authenticating said security log data using a public key corresponding to said private key.

8. The method of claim 1, wherein said receiving said security log data comprises receiving a timestamp associated with said security log data, wherein authenticating said data transmission comprises determining whether said timestamp associated with said security log data has expired.

9. The method of claim 1, wherein said authentication information comprises a key, wherein the method further comprises querying a database using said key.

10. The method of claim 9, further comprising overwriting at least a portion of data in said database if said querying returns data indicative of said first computer network security device.

11. The method of claim 9, further comprising adding data to said database using said key.

12. The method of claim 11, wherein said adding data uses a received identification of said first computer network security device.

13. The method of claim 1, wherein said authenticating said data transmission using said authentication information comprises querying a database for said authentication information.

14. The method of claim 13, wherein said authenticating said data transmission using said authentication information comprises validating a received signature using said authentication information.

15. The method of claim 1, further comprising storing said security log data in a database.

16. The method of claim 1, wherein said authenticating said data transmission said authentication information further comprises querying a database for said authentication information.

17. The method of claim 1,
   wherein the security log data indicates source and destination ports for network connections, wherein automatically performing the one or more queries on the security log data to identify the plurality of sub-events comprises automatically performing one or more queries to analyze the source and destination ports.

18. The method of claim 1,
   wherein the security log data indicates sequences of network connection information, wherein automatically performing the one or more queries on the security log data to identify the plurality of sub-events comprises automatically performing one or more queries to analyze the sequences of network connection information.

19. The method of claim 1,
   wherein the security log data indicates network connection attempts, wherein automatically performing the one or more queries on the security log data to identify the plurality of sub-events comprises automatically performing one or more queries to detect excessive network connection attempts.

20. The method of claim 1, further comprising:
   storing event data representing the one or more patterns.

21. The method of claim 1, wherein the plurality of sub-events is a first plurality of sub-events, wherein the method further comprises:
   said operations center receiving additional security log data from a second computer network security device located within a second computer network;

said operations center analyzing the additional security log data to identify a second plurality of sub-events indicative of malicious activity in the second computer network; and said operations center automatically correlating one or more of the first plurality of sub-events indicative of malicious activity in the first computer network with one or more of the second plurality of sub-events indicative of malicious activity in the second computer network.

22. The method of claim 1, wherein the plurality of sub-events is a first plurality of sub-events, wherein the method further comprises:

said operations center receiving additional security log data from a second computer network security device located within the first computer network;

said operations center analyzing the additional security log data to identify a second plurality of sub-events indicative of malicious activity in the first computer network; and said operations center automatically correlating one or more of the first plurality of sub-events indicative of malicious activity in the first computer network with one or more of the second plurality of sub-events indicative of malicious activity in the first computer network.

23. The method of claim 1, further comprising:

prior to analyzing the security log data, said operations center normalizing the security log data into a normalized format.

24. One or more computer-readable storage media storing program instructions that are computer executable to:

store authentication information associated with a first computer network security device in a database in an operations center, wherein said first computer network security device is located within a first computer network and is configured generate security log data for said first computer network, and wherein said operations center is configured to monitor security of a plurality of computer networks;

receive said security log data at the operations center in data transmission from said first computer network security device, including receiving a signature generated by said first computer network security device;

authenticate said data transmission using said authentication information, including determining whether a timestamp associated with the received signature has expired; and analyze said security log data to monitor security of said first computer network, wherein said analyzing comprises:

automatically performing one or more queries on the security log data to identify a plurality of sub-events indicative of malicious activity in said first computer network;

storing data representing the plurality of sub-events; and automatically correlating one or more of the sub-events in order to identify one or more patterns indicative of malicious activity in said first computer network.

25. An operations center comprising:

one or more processors;

a memory storing program instructions that are executable by the one or more processors to:

receive authentication information associated with a computer network security device, wherein said computer network security device is located within a first computer network and is configured to generate security log data for said first computer network, and wherein said operations center is configured to monitor security of a plurality of computer networks;

receive said security log data in data transmission from said computer network security device, including receiving a signature generated by said computer network security device;

authenticate said data transmission using said authentication information, including determining whether a timestamp associated with the received signature has expired; and analyze said security log data to monitor security of said first computer network, wherein said analyzing comprises:

automatically performing one or more queries on the security log data to identify a plurality of sub-events indicative of malicious activity in said first computer network;

storing data representing the plurality of sub-events; and automatically correlating one or more of the sub-events in order to identify one or more patterns indicative of malicious activity in said first computer network.

* * * * *